United States Patent [19]

Ellis et al.

[11] 3,932,078

[45] Jan. 13, 1976

[54] APPARATUS FOR MANUFACTURING POWER TRANSMISSION BELTING

[75] Inventors: Robert C. Ellis, Denver; James C. Vance, Sr., Sedalia; Sterling Van Gundy; Donald R. Walcher, both of Denver, all of Colo.

[73] Assignee: The Gates Rubber Company, Denver, Colo.

[22] Filed: Mar. 13, 1975

[21] Appl. No.: 558,048

[52] U.S. Cl. ............... 425/28 B; 425/34 B; 425/43
[51] Int. Cl.² ..................... B29H 7/22; B29D 29/00
[58] Field of Search ................. 425/28 B, 34 B, 43

[56] References Cited
UNITED STATES PATENTS

| | | | |
|---|---|---|---|
| 2,253,792 | 8/1941 | Leavenworth | 425/28 B |
| 2,573,643 | 10/1951 | Hurry | 425/34 B |
| 2,583,085 | 1/1952 | Campbell | 425/34 B |
| 2,599,046 | 6/1952 | Brucker | 425/34 B |
| 2,600,775 | 6/1952 | Hurry et al. | 425/34 B X |
| 2,671,244 | 3/1954 | Freedlander | 425/28 B |
| 2,883,701 | 4/1959 | Sauer | 425/34 B |

FOREIGN PATENTS OR APPLICATIONS

| | | | |
|---|---|---|---|
| 875,283 | 8/1961 | United Kingdom | 425/28 B |

*Primary Examiner*—J. Howard Flint, Jr.
*Attorney, Agent, or Firm*—H. W. Oberg, Jr.; Raymond Fink; Curtis H. Castleman, Jr.

[57] ABSTRACT

Apparatus for making power transmission belting from an uncured body which apparatus includes two concentric cylindrical members of substantially the same length which are interpositioned between two generally flat parallel plates clamped together by a press means. A bladder assembly disposed within and together with the innermost cylindrical member define a mold concavity for receiving, molding, and curing power transmission belting.

3 Claims, 3 Drawing Figures

APPARATUS FOR MANUFACTURING POWER TRANSMISSION BELTING

BACKGROUND OF THE INVENTION

The invention relates to apparatus for manufacturing power transmission belts, but more particularly, the invention relates to apparatus for molding and curing power transmission belting.

Belting may be processed by apparatus which molds and cures successive incremental portions of belting, or by apparatus which simultaneously molds and cures an entire uncured body into endless belting. This invention is directed to that category of apparatus which simultaneously cures and molds an entire body. Apparatus of this category includes the "shell" and "mandrel" molds. The invention primarily falls within the shell mold category where uncured belting is placed internally of a cylindrical mold member. An expansible member such as a bladder or expansible stock is positioned inwardly of the expansible member. The cylindrical member and expansible member define a mold concavity therebetween. Radially outwardly expansion of the flexible member, with simultaneous application of heat, pressurizes, molds and cures the uncured body. Examples of such apparatus are disclosed in U.S. Pat. Nos. 2,671,244 to Freedlander; 2,573,643 to Hurry; and 2,883,701 to Sauer.

The mandrel curing technique is similar to the shell mold curing technique except that the rigid and flexible portions of the mold are interchanged. The bladder is positioned radially outwardly from the rigid cylindrical member. Uncured belting of individual belt strands or sleeves are interpositioned between the flexible and rigid mold members. The flexible member is displaced radially inwardly under pressure while heat is applied to effect curing and molding of the belting.

The shell and mandrel curing techniques are preferred in the belt making art because they effect molding with a minimum number of irregularities in one inclusive step.

While the shell and mandrel apparatus are accepted standards in the belt making art, their use require cooperation with a sealed heat chamber such as an autoclave. Once placed within an autoclave, special consideration must be given to the mold concavity for proper venting. Shell molds may be vented by means of tiny apertures manifolded together to a vacuum line while the concavity of a mandrel mold may be opened to the autoclave environment or a vacuum line. In either case, special consideration must be given to the molded product to avoid contamination by the autoclave atmosphere. Steam or water may cause blistering of the belting during the curing process.

A problem associated with apparatus that must be placed in an autoclave is interchangeability of the rigid portion of the mold or bladder. The expansible member of the apparatus has limited deformation characteristics and cannot be used with rigid cylindrical members having a circumference change of greater than 20 percent. A bladder of larger diameter must be used.

Another problem associated with prior art apparatus is that of removing the molded belting from the apparatus after completion of curing. Prior art apparatus essentially requires disassembly of component parts of the mold to effect removal. For example, in the apparatus of Freedlander supra, the entire bladder assembly must be removed from the autoclave and the end portions removed before the product can be effectively taken from the mold. The disassembly and reassembly are economical disadvantages. In other words, the prior art does not disclose means for at least partially ejecting molded and cured belting at least partially from the mold so that it can be easily grasped and removed for further processing.

Still another disadvantage with prior art apparatus is that the autoclave in which they are placed requires fluids to be entrapped in the end closures of the autoclave. Such fluid entrapment in the end closures contributes to a heat waste. For example, some belting tensile sections shrink with application of heat. An example of such is a tensile section of polyester cord. During a typical curing cycle, fluids such as steam are directed to all cavities of the mold including the end closures. After a sufficient curing period, the steam is expelled. In a shell type process, the thermal shrinkage associated with a polyester cord tensile section pulls the belting away from the rigid portion of the mold. Fluid under pressure must be maintained within a bladder system while the tensile section cools in an extended condition. Cold water cannot be used immediately with a pressure-heat medium of steam to cool the belting because the steam would immediately condense to water causing a substantial reduction in the bladder pressure. Hot water or other fluid must be used to preclude the bladder from collapsing prematurely. Heat used for voluminous end closures is wasted.

SUMMARY OF THE INVENTION

In accordance with the invention, apparatus is provided which retains the heat curing benefits of an autoclave system but which excludes many deleterious autoclave requirements such as: disassembly and reassembly for each curing cycle; and heat loss. In accordance with the invention, two generally cylindrical members having the same general longitudinal length are interpositioned between upper and lower substantially flat parallel plates. One of the cylinders defines a mold member while the other cylinder defines a vessel member. Sealing means are disposed between the end portions of the cylindrical members and flat plates. A bladder assembly with means for contouring the bladder during expansion is disposed inwardly of the cylindrical mold member. A mold concavity for receiving uncured belting is defined between the mold member and bladder. The mold concavity is preferably vented directly to atmosphere. The bladder assembly is optionally partially reciprocally extensible from the mold member after the upper plate is removed. The bladder and the bladder contouring means are usable with old members having substantially different circumferences.

Accordingly, a primary object of the invention is to provide endless belt molding apparatus which includes advantages of and excludes the disadvantages of an autoclave type molding system.

Another object of the invention is to provide molding apparatus with automatic demolding capability.

Still another object of the invention is to provide a mold apparatus having a bladder which may be used with a plurality of mold members.

An advantage of the apparatus of the invention is that it provides a system that is readily adaptable to frequent mold changes.

Another advantage of the invention is that it minimizes product and apparatus handling during the molding, curing and demolding steps of the typical power transmission belt making process.

These and other objects or advantages of the invention will be apparent after reviewing the figures and description thereof wherein.

DESCRIPTION OF PREFERRED EMBODIMENT

Figure 1:
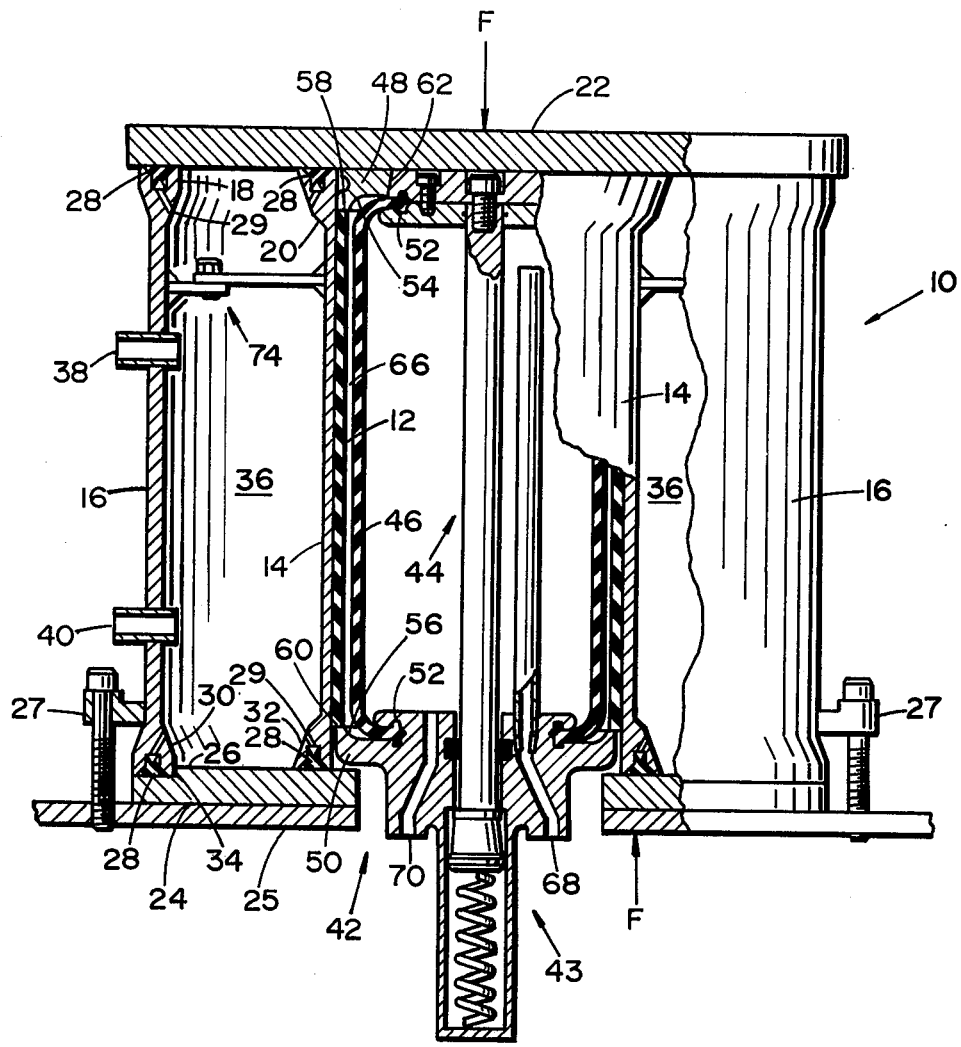
FIG. 1 is a front view in partial axial cross-section showing apparatus of the invention with belting disposed therein.

In accordance with the invention, molding apparatus 10 is provided for making transmission belting from an uncured heat settable elastomeric body 12. The apparatus includes a mold member 14 of substantially cylindrical shape and a vessel member 16 that is preferably cylindrical and substantially concentric with the mold member. The mold and vessel members have generally the same length with their upper ends 18, 20 substantially coplanar. The mold and vessel members are interpositioned between a generally flat upper plate 22 and a lower base plate 24 having at least one surface 26 substantially parallel to the coplanar ends 18, 20 of the vessel and mold. The base plate may be of two pieces 24, 25 as shown for ease of disassembly or it may be a single piece. The plates may be held in appropriate relation by fasteners 27. The mold member rests on the planar surface of the base plate.

Of course, the vessel member may be of any shape such as square, rectangular, polygonal, etc. For ease of fabrication and for maximum strength with minimum material weight, it is preferably cylindrical.

Sealing means 28 are disposed at each end 18, 30 of the vessel and each end 20, 32 mold member. The sealing means of the mold member and of at least the upper end of the vessel member are preferably of the pressure type such as pressure loaded lip seals or O-rings. The ends of the vessel and mold members have a groove for receiving the seal. The seal is of an elastomeric type such as the natural or synthetic rubbers. A channel 29 preferably runs from the bottom of the groove to the exterior of the mold member and interior of the vessel member to help pressure actuate the pressure type lip seals. The lower rim of the vessel member may also have the same pressure type seal. The pressure seal is preferred because it eliminates thermal stress between the vessel member and base plate when the mold is heated and cooled. Of course, any suitable pressure type seal may be substituted for the O-ring seals without affecting the intended operation of the molding apparatus.

Preferably, the lower plate 26 is flanged 34 to center and prevent lateral movement of the vessel member 18. Although the flange is unnecessary for the operation of the apparatus, it aids in the assembly and disassembly of the apparatus for repair. The vessel member may be sealed to the lower base plate with permanent sealing means such as a weld.

The volume established by the facing walls of the upper and lower plates, and the mold and vessel members define a heat chamber 36. Inlets 38 and outlets 40 are provided through the wall of the vessel member for the purpose of directing pressurized fluids to and from the heat chamber.

Figure 2:
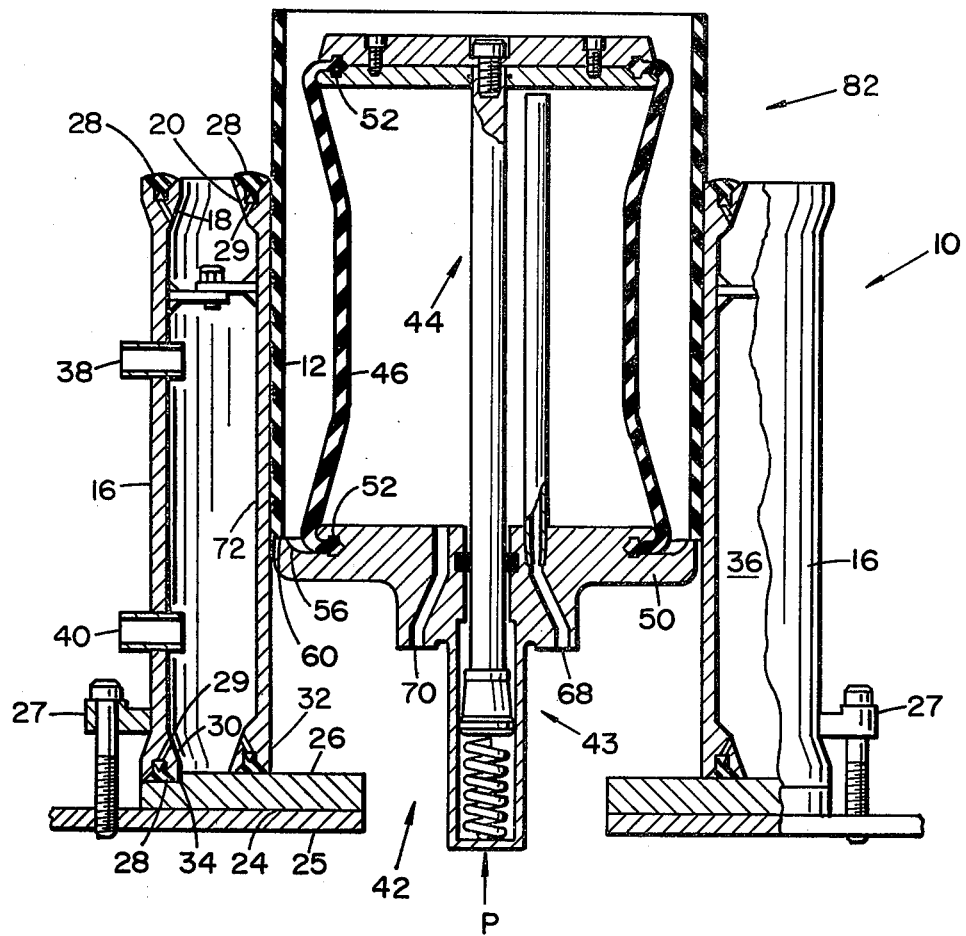
FIG. 2 is a view similar to FIG. 1 showing apparatus with the cover plate removed, a larger mold member, and belting demolded and ejected from the apparatus.

The upper plate 22 is selectively removable from the plane and sealing means 28 of the mold and vessel members as shown in FIG. 2. The upper plate may be automatically removed and positioned by any suitable means. Preferably, the upper plate is selectively removed by a press means having capability of clamping the upper and lower plates together with sufficient force F—F to activate the sealing means 28 while simultaneously counteracting internal pressures. Any conventional press means may be used. One convenient press means that may be readily adapted to apply such clamping force F—F is disclosed in U.S. Pat. No. 2,795,664.

The lower plates 24, 25 have an opening 42 through which extends a bladder assembly 43 including a bladder support member 44, a bladder 46, and upper and lower disk members 48, 50. The bladder is of the expansible elastomeric type and has a generally cylindrical shape with curved end portions that are fixedly attached 52 to the bladder support member in known fashion. The facing sides of the upper and lower disk members have smoothly curved circumferentially concave portions 54, 56 that extend to their rims. The rims are substantially normal to the surface of the mold member and preferably have predetermined radial thicknesses 58, 60 which generally equals the nominal thickness of the belting 12 that is to be molded and cured. The lower disk 50 member is operatively attached to the bladder support while the upper disk member is removable from the bladder support member. The upper disk 48 may be manually removed from the bladder support or it may be operatively attached to the upper plate 22 for automatic removal. The upper and lower disks may have a conical surface 62 which nests with mating concical surfaces of the bladder support member for the purpose of facilitating attachment or alignment. The rim portions of the upper and lower disk members define mold surfaces at the radial thicknesses 58, 60 for producing a square corner on a molded piece of belting. The rim 60 of the lower disk also operates as part of an ejection system that operates in a manner which will later be explained. The mold member 14, rim thicknesses 58, 60 surfaces, and bladder 46 define the mold concavity 66 of the apparatus.

Means 68, 70 are provided in the support member to direct pressurized fluid to and from the bladder respectively. Preferably, the bladder is also deflated by means of a vacuum system having sufficient capability to collapse the bladder radially inwardly.

The mold concavity 66 is sealed from the heat chamber 36 and bladder 46 and is directly vented through the lower plate opening 42 to atmosphere. Optionally, means may also be provided in the upper plate to further vent the mold concavity. The vent allows the bladder to be freely expanded while also allowing an escape path for any gases trapped in or around a piece of uncured belting.

It should be emphasized that the substantially flat upper and lower plates allow for an arrangement where the advantages of an autoclave system are realized while the disadvantages of an autoclave system are rejected. The flat plates 22, 26 preclude the unnecessary domeshaped end closure structure of the typical autoclave system. They also provide a simple means for sealing the heat chamber 36 from the mold concavity 66. The sealed bladder arrangement and the vented mold concavity preclude contamination of a piece of belting with the curing environmental medium. In an autoclave type system, it is possible for the mold concavity to be subjected to environmental steam. Other means must be provided to withdraw such steam from the system. As previously mentioned, water or water vapors may cause blisters in a piece of belting during curing thereof.

The bladder assembly is optionally reciprocally movable to be at least partially extensible from the mold member. Extensibility may be accomplished with known mechanisms such as by a lever system, pivot, slip joint, and pressure cylinder, not shown. When the bladder assembly is extended from the mold by a force p as particularly shown in FIG. 2, the lower disk 50 moves upwardly in relation to the mold member 14. As it moves upwardly, the lower disk demolds any belting disposed in the mold concavity while also ejecting a portion for easy grasping. A vacuum means aids in demolding by pulling the bladder away from the belting.

The substantially flat upper and lower plates provide a feature not found in other belt making apparatus. The flat plates facilitate easy interchangeability with other size mold members such as of larger circumference as is illustrated in FIG. 2. A new mold member 72 is easily inserted after removing the upper plate and old mold member. Preferably, fastening means are provided between the outer vessel and mold members to align and hold the mold member. When compared to prior art autoclave systems, it is seen that the need for a new bladder for each mold member is eliminated and also the need for new closure plates for each mold member is eliminated.

Figure 3:
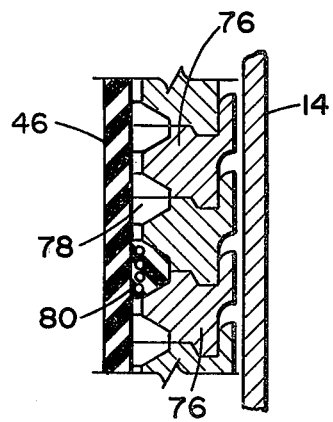
FIG. 3 is a view illustrating stacked annular rings as a variation for use with the apparatus of the invention.

Optionally, and as shown in FIG. 3, a plurality of stacked rings 76 may be provided and placed in each mold concavity to define individual concavities 78 of substantially trapezoidal cross-section for receiving individual belt bodies 80. Examples of such rings are disclosed in U.S. Pat. Nos. 3,398,218 to Richmond and 2,573,643 to Hurry.

Uncured belting is fabricated in known manner for use with the apparatus. The uncured belting may be in the form of individual bodies or it may be in the form of a sleeve. For the purpose of this disclosure, both the individual belt bodies or sleeve are referred to as an "uncured body." Similarly, the term "belting" is used to define individual belt bodies or a belt sleeve. The uncured body includes an embedded tensile section that is usually of an endlessly spiralled cord.

When the apparatus of the invention is used for making power transmission belting, the upper plate 22 is removed from the coplanar surfaces of the mold and vessel members to expose the cavity for receiving the uncured body. The upper disk member may be manually removed or attached to the upper plate for automatic removal. The bladder 46 is deflated to allow easy placement of an uncured body to a position where it rests on the rim 60 of the lower disk member. The upper disk member 48 is placed over the bladder assembly and the upper plate 22 is repositioned. The upper and lower plates are clamped together with sufficient force F—F to activate the seals. Pressurized fluid is introduced into the bladder which expands it against the uncured body. The clamping force must be sufficient to counteract the pressure in the heat chamber 36 and the bladder 46. The fluids used may be of the conventional type such as hot water, steam, or inert gas. Similarly, a fluid is introduced into the heat chamber. The fluid directed to a heat chamber does not have to be at a high pressure to effect molding of the uncured body. It may be a low pressure fluid with high heat capacity.

The channels 29 drain condensates, such as water, from annular grooves that receive the sealing means 28. They also provide means for pressurizing the seal from underneath to insure activation.

As the bladder is expanded, it is contoured to a generally smooth shape by the concave portions 54, 56 disk members which effect a smooth transition between the bladder 46 uncured body. The contouring effected by the concave portions gives the bladder a satisfactory service cycle life. This is because the disk members preclude the bladder from being expanded with creases, with a minimum bend radius or with reverse bends. The disk members also allow one size of bladder to be used for several diameter mold members. For example, a bladder having a free diameter of nominally 15 inches has been used satisfactorily with mold members having diameters generally of the range 16 inches to 20 inches. Of course, a larger sized bladder may be used with mold members having larger diameters.

Sufficient pressure is maintained in the bladder to mold the uncured body. Heat is sustained in the heat chamber 36 for sufficient time to effect curing. For example, a pressure of from generally 200 to 250 psi may be adequate to effect molding while heat is applied at 350° F. for 8 minutes to effect curing. Generally, most rubbers may be cured when heated to 300° F. for a period of 30 minutes.

The upper plate 22 is removed after the belting is cured. The bladder is deflated and the bladder assembly is at least partially extended 82 from the mold. The lower disk bears on the lower edge of the belting at radial thickness 60 which mechanically demolds the belting and positions it to a point for easy removal.

A cured belt sleeve may be cut into individual belts having desired cross-sections such as rectangles or trapezoidals.

If individually stacked rings are used to mold uncured bodies, they are loaded in a successive manner in the mold as shown in FIG. 3 and the curing process is conducted as explained above. After curing is complete, the upper flat plate is removed and the entire assembly is ejected from the mold where the stacked rings and individually cured bodies may be removed.

The foregoing detailed description is made for purpose of illustration only and it is not intended to limit the scope of the invention which is to be determined from the appended claims.

What is claimed is:

1. An apparatus for making power transmission belting from an uncured body comprising:
   a cylindrical mold member having generally parallel open ends;
   a generally cylindrically shaped bladder with inwardly curved end portions, the bladder disposed in the mold with the curved end portions generally juxtaposed the open ends of the mold member;
   two disk members, each having a smoothly curved circumferential concave portion on one side that extends to near it rim, the disk members disposed near each end of the mold member with their concave portions facing each other, the concave portions defining a generally smooth transition between the mold member and disk members;
   closure plates disposed over the ends of the mold;

press means for selectively holding the closure plates in position over the ends of the mold; and means for admitting and rejecting pressurized fluid to and from the bladder.

2. An apparatus for making power transmission belting from an uncured body comprising:

a generally flat lower base plate;

a selectively removable cylindrical mold member having generally parallel open ends with one end removably attached to the base plate;

a generally cylindrical vessel member having generally parallel open ends and a length generally equal that of the mold member, the vessel member spaced outwardly of the mold member with one end substantially fixedly attached to the base plate;

a generally flat and removable upper cover plate disposed over the other end of the mold and vessel members;

sealing means disposed at the ends of the mold and vessel members for effecting a pressure seal with the base and cover plates, the mold member, vessel member, base plate, cover plate and sealing means defining a sealed heat chamber;

a generally cylindrically shaped bladder with inwardly curved end portions, the bladder disposed in the mold with the curved end portions near the open ends of the mold member, the mold member and bladder defining a mold concavity for receiving the uncured body;

two facing disk members disposed in each end of the mold and having smoothly curved circumferential concave portions defining a generally smooth transition between the mold and disk members;

means for venting the mold concavity;

means for admitting and rejecting pressurized fluid to and from the bladder and heat chamber; and press means for selectively clamping the cover and base plates relatively toward each other.

3. An apparatus for making power transmission belting from an uncured body comprising:

a generally flat lower base plate;

a selectively removable cylindrical mold member having generally parallel open ends with one end removably attached to the base plate over the base plate opening;

a generally cylindrical vessel member having generally parallel open ends and a length generally equal that of the mold member, the vessel member spaced outwardly of the mold member with one end substantially fixedly attached to the base plate;

a generally flat and removable upper cover plate disposed over the other end of the mold and vessel members;

sealing means disposed at the ends of the mold and vessel members for effecting a pressure seal with the base and cover plates, the mold member, vessel member, base plate, cover plate and sealing means defining a sealed heat chamber;

a bladder support member extending through and movable upwardly reciprocally from the base plate opening;

means for reciprocating the bladder support member to be at least partially extensible from the mold member;

a generally cylindrically shaped bladder with inwardly curved end portions operatively connected to the bladder support member, the bladder disposed in the mold with the curved end portions near the opened end of the mold member when the reciprocating means is in the retracted position, the mold concavity for receiving the uncured body defines between the mold member and bladder;

upper and lower disk members having diameters less than and disposed in each end of the mold, the disk members having smoothly curved circumferential concave portions which extend to a rim of the disk members that is substantially normal to the surface of the mold member, the lower disk member operatively connected to and reciprocal with the bladder support member and the upper disk member supported by and selectively removable from the bladder support member, the concave portions defining a generally smooth surface transition between an uncured body disposed in the mold concavity and the disk members, and the rim portion of the disk members defining a mold surface;

means for venting the mold concavity;

means for admitting and rejecting pressurized fluid to and from the bladder and heat chamber; and press means for selectively clamping the cover and base plates relatively toward each other.

* * * * *